UNITED STATES PATENT OFFICE 2,496,957

1-ALKYL-(N-BENZYL-N-ALPHAPYRIDYL-AMINO)-PIPERIDINES AND THEIR PRODUCTION

Robert H. Reitsema, Kalamazoo, Mich., assignor to The Upjohn Company, Kalamazoo, Mich., a corporation of Michigan No Drawing. Application June 18, 1949,
Serial No. 100,087

5 Claims. (Cl. 260—293)

This invention relates to 1-alkyl-(N-benzyl-N-alphapyridylamino)-piperidines and salts thereof with acids. This application is a continuation in part of copending applications Serial No. 24,422, now abandoned, filed April 30, 1948, and Serial No. 29,414, now abandoned, filed May 26, 1948.

The new 1-alkyl-(N-benzyl-N-alphapyridylamino)-piperidines contain lower-alkyl groups on the nitrogen of the piperidine ring. They may be represented by the formula:

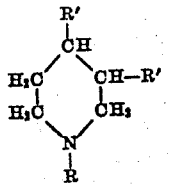

wherein R is a lower-alkyl radical containing from one to eight carbon atoms, inclusive, one R' is hydrogen and the other R' is the N-benzyl-N-alpha-pyridylamino radical having the formula

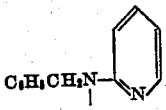

The new tertiary amines are high-boiling substances which are viscous liquids or solids at room temperature, readily soluble in most common organic liquids, and only slightly soluble in water. The free bases form addition salts with mineral acids such as hydrochloric, hydrobromic, and sulfuric; with organic carboxylic acids such as acetic, lactic, tartaric, and succinic; and with picric acid. The acid salts are usually very water soluble. Some salts, e. g., the hydrochlorides, have such a strong affinity for water that it is difficult to obtain them in an anhydrous form. The salts can, however, be prepared readily in aqueous solution.

The compounds of the invention, have three strongly basic tertiary amino groups and are capable of forming salts with from one to three equivalents of an acid. The mono- and di-acid salts may be formed by mixing the stoichiometric quantity of the acid with a solution of the amine and evaporating to dryness. An excess of acid gives only the tri-acid salt of the base. When the salt is used for therapeutic purposes, since the therapeutic activity resides in the basic portion of the molecule, the acid groups attached thereto are of significance only in that they should be non-toxic and in that they dilute the effectiveness of the molecule, on a weight basis, in proportion to their number.

The new 1-alkyl-(N-benzyl-N-alphapyridylamino)-piperidines can be prepared by the alkylation of a 1-alkyl-3-benzylaminopiperidine or a 1-alkyl-4-benzylaminopiperidine, respectively, with a 2-halopyridine, preferably with 2-bromopyridine or 2-chloropyridine.

The 1-alkyl-benzylaminopiperidines useful as starting materials in the method of the present invention, together with a method for their preparation, are described and claimed in prior filed copending applications Serial No. 24,426, now abandoned, filed April 30, 1948, and Serial No. 29,413, now abandoned, filed May 26, 1948, and in concurrently filed copending application Serial No. 100,088, now Patent 2,496,958. According to the method claimed in the applications referred to, a 1-alkyl-piperidone is condensed with benzylamine to form a 1-alkyl-benzyliminopiperidine and the latter then hydrogenated to form a 1-alkyl-benzylaminopiperidine, the condensation and hydrogenation generally being carried out in a single step.

The alkylation requires an elevated temperature and the presence in the reaction mixture of an acid-binding agent. In some instances an alkylation catalyst may be helpful. The alkylation can be conducted without a diluent or with a diluent such as toluene, xylene, or cymene, as desired. Various catalysts useful in alkylating amines, such as finely divided copper-bronze, can be used if desired. Anhydrous metal carbonates or bicarbonates are useful acid-binding agents, those of the alkali metals being preferred. An excess of the starting amine can also be used for acid-binding purposes. The alkylation can be carried out by mixing the reactants and catalyst together in substantially equimolar proportions with or without a diluent and heating, e. g. to a temperature of about 160–180 degrees centigrade. The length of the period of heating is not of critical importance, periods of from 5 to 50 hours being suitable.

The reaction product can be treated for separation and purification of the formed product in any one of several ways known to the art. For example, after cooling, water is added and the copper-bronze or other catalyst, if employed, removed by filtration. The early removal of catalyst aids in separation of the water layer from the organic layer, the latter containing most of the product. After separation, the water layer is extracted with a water-immiscible solvent such as ether, benzene, or xylene. This extract, after separation from water, is combined with the organic layer, the combined solutions are dried, the solvent is removed, and the resulting 1-alkyl-(N-benzyl-N-alphapyridylamino)-piperidine is isolated and purified by distillation, crystallization, or both. Other ways of isolating and purifying the products will be apparent to those familiar with the art.

Salts of the amines with acids can be prepared in various ways known to the art. If an aqueous solution of the salt is desired, the free amine can be titrated with acid in an aqueous medium until the resulting solution has attained the desired pH. If it is desired to isolate the amine salt, this can be done by evaporating its solution to dryness. Alternatively, a solution of the amine can be reacted with a solution of an acid, the solvent chosen being one in which the amine salt is insoluble, whereupon the insoluble salt precipitates. Many of the salts are hygroscopic in nature. Some are freed from solvent only with difficulty.

The following examples illustrate the invention but are not to be construed as limiting.

*Example 1.—1-ethyl-4-benzylaminopiperidine*

Thirty-four and five-tenths grams of 1-ethyl-4-piperidone (Fuson, Parham and Reed, J. Am. Chem. Soc. 68, 1239 (1946)) and 27.9 grams of benzyl amine were thoroughly mixed at a temperature between 15–25 degrees centigrade. To the reaction mixture was then added 50 milliliters of absolute alcohol and about 0.2 gram of Adam's platinum oxide catalyst. The alcoholic solution was shaken under a hydrogen pressure of about 50 pounds per square inch at room temperature in a suitable apparatus. The absorption of hydrogen was complete after about two hours, whereupon the catalyst was removed by filtration and the resulting 1-ethyl-4-benzylaminopiperidine, boiling at 113–115 degrees centigrade at a pressure of 0.2 millimeter, was isolated by distillation. The dipicrate thereof melts at 227–228 degrees centigrade and the dihydrochloride melts at 303–304.5 degrees centigrade with decomposition.

*Example 2.—1-methyl-4-benzylaminopiperidine*

In a manner similar to Example 1, there was obtained from 1-methyl-4-piperidone and benzyl amine, 1-methyl-4-benzylaminopiperidine, boiling at 168 to 172 degrees centigrade at 17 millimeters of mercury pressure. Its dipicrate melts at 225.5 to 227 degrees centigrade with decomposition.

*Example 3.—1-methyl-4-(N-benzyl-N-alphapyridylamino)-piperidine*

To a stirred suspension of 23.5 grams of 1-methyl-4-benzylaminopiperidine, 15.0 grams of anhydrous potassium carbonate and 0.2 gram of finely divided copper-bronze powder, there was added 18.2 grams of 2-bromopyridine. The temperature of the reaction mixture was then raised to about 160–180 degrees centigrade where it was maintained for about 45 hours. The mixture was cooled to about room temperature and 25 milliliters of water added. After the copper-bronze powder was removed by filtration, the aqueous layer was separated from the organic layer and extracted with ether. The ether extract was combined with the organic layer previously separated, the combined layers dried, ether removed, and the residual 1-methyl-4-(N-benzyl-N-alphapyridylamino)-piperidine distilled at 188–189 degrees centigrade under a pressure of 0.5 millimeter of mercury. The product on redistillation boiled at 185–187 degrees centigrade at a pressure of 0.4–0.5 millimeter of mercury. The trihydrochloride after crystallization from alcohol melted at 256–260 degrees centigrade.

*Example 4.—1-ethyl-4-(N-benzyl-N-alphapyridylamino)-piperidine*

In a manner similar to Example 3 from 1-ethyl-4-benzylaminopiperidine and 2-bromopyridine there was obtained 1-ethyl-4-(N-benzyl-N-alphapyridylamino)-piperidine, boiling at 188–194 degrees centigrade under a pressure of 0.6 millimeter of mercury. The dipicrate thereof melted at 217–218 degrees centigrade after crystallization from ethanol.

*Example 5*

To 177.9 grams of ethyl N-ethylaminoacetate was added with cooling 132.0 grams of ethyl $\gamma$-bromobutyrate. The reaction mixture was allowed to stand for three days at room temperature. The ethyl N-ethylaminoacetate hydrobromide which precipitated was removed by filtration. The residual liquid was distilled under a pressure of 20 millimeters of mercury, whereupon 109 grams of ethyl $\gamma$-(N-carbethoxymethyl-N-ethylamino)-butyrate, distilling at 161–163 degrees centigrade; $n_D^{24}$ 1.4392, was obtained.

*Example 6*

The ester from Example 5 was cyclized by the technique of J. Am. Chem. Soc. 68 (1946), whereupon 1-ethyl-3-piperidone hydrochloride, melting at 172–173.5 degrees centigrade was obtained.

*Example 7*

Forty and nine-tenths grams of 1-ethyl-3-piperidone hydrochloride and 23.4 mols of benzyl amine were thoroughly mixed at a temperature between 15 and 25 degrees centigrade. To the reaction mixture was then added 100 milliliters of methanol and about 0.2 gram of platinum oxide catalyst. The alcoholic solution was shaken under a hydrogen pressure of about 50 pounds per square inch at room temperature in a suitable apparatus, the absorption of hydrogen being complete after about one hour. The catalyst was removed and the resulting 1-ethyl-3-benzylaminopiperidine, boiling at 118–120 degrees centigrade at a pressure of 0.7 millimeter of mercury, was isolated by distillation; $n_D^{20}$ 1.5273. Its dipicrate melts at 200–202 degrees centigrade.

*Example 8*

In a manner similar to Example 7 there was obtained from 1-methyl-3-piperidone (J. Am. Chem. Soc. 55, 1233 (1933)) and benzyl amine, 1-methyl-3-benzylaminopiperidine boiling at 112–117 degrees centigrade at a pressure of 1 millimeter of mercury; $n_D^{23}$ 1.5299. Its dipicrate melts at 191–193 degrees centigrade.

Other compounds which may be produced according to the procedure given in the foregoing, and which are included as starting materials within the scope of the invention, are the 1-alkyl-3-benzylaminopiperidines, wherein the 1-alkyl group is propyl, isopropyl, butyl, or the like. These are prepared by employement in the process of the corresponding 1-alkyl-3-piperidone.

*Example 9.—1-ethyl-3-(N-benzyl-N-alphapyridylamino)-piperidine*

To a stirred suspension of 20.2 grams of 1-ethyl-3-benzylaminopiperidine, 12.8 grams of potassium carbonate and 0.2 gram of copper-bronze powder, there was added 14.6 grams of 2-bromopyridine. The temperature of the reaction mixture was then raised to 160-170 degrees centigrade where it was maintained for about 48 hours. The mixture was then cooled to about room temperature and 25 milliliters of water and 100 milliliters of ether added. After the copper-bronze powder was removed by filtration, the ether layer was separated and the aqueous layer again extracted with ether. The ether extracts were combined, the combined extracts dried, and the ether removed and the residual 1-ethyl-3-(N-benzyl-N-alphapyridylamino)-piperidine distilled at 140-170 degrees centigrade under a pressure of 0.3 millimeter of mercury. The product, on redistillation, boiled at 155-160 degrees centigrade at 0.2 millimeter of mercury. The dipicrate melts at 162—163 degrees centigrade with decomposition.

*Example 10.—1-methyl-3-(N-benzyl-N-alphapyridylamino)-piperidine*

In a manner similar to Example 9 from 1-methly-3-benzylaminopiperidine and 2-bromopyridine there was obtained 1-methyl-3-(N-benzyl-N-alphapyridylamino)-piperidine, boiling at 163-164 degrees centigrade.

Other compounds within the scope of the invention which may be prepared by employing a suitable 1-alkyl-4-benzylaminopiperidine or 1-alkyl-3-benzylaminopiperidine in the process given include 1-propyl-, 1-isopropyl-, and 1-butyl-4-(N-benzyl-N-alphapyridylamino)-piperidine, 1-propyl-, 1-isopropyl-, 1-butyl-3-(N-benzyl-N-alphapyridyl-amino)piperidine, and the like.

I claim:
1. A compound selected from the group consisting of: (a) 1-lower-alkyl-4-(N-benzyl-N-alphapyridylamino)-piperidines and 1-lower-alkyl-3-(N-benzyl-N-alpha-pyridylamino)-piperidines wherein the lower-alkyl radical contains from one to eight carbon atoms, inclusive, and (b) salts thereof with acids.
2. 1-methyl-4-(N-benzyl-N-alphapyridylamino)-piperidine.
3. 1-ethyl-4-(N-benzyl-N-alphapyridylamino)-piperidine.
4. 1-ethyl-3-(N-benzyl-N-alphapyridylamino)-piperidine.
5. The method which includes the step of heating a compound from the group consisting of the 1-alkyl-4-benzylaminopiperidines and the 1-alkyl-3-benzylaminopiperidines with a halopyridine from the group consisting of 2-bromopyridine and 2-chloropyridine in the presence of an acid-binding agent to form a compound from the group consisting of the 1-alkyl-4-(N-benzyl-alphapyridylamino)-piperidines and the 1-alkyl-3-(N-benzylalphapyridylamino)-piperidines.

ROBERT H. REITSEMA.

No references cited.